United States Patent
Reinhard et al.

[11] Patent Number: 5,518,290
[45] Date of Patent: May 21, 1996

[54] MOTOR VEHICLE DOOR PENETRATION-LIMITING DEVICE

[75] Inventors: Manfred Reinhard, Grossmehring; Bernhard Speth, Geroldshausen, both of Germany

[73] Assignee: Bayerische Motoren Werke AG, Germany

[21] Appl. No.: 301,026

[22] Filed: Sep. 6, 1994

[30] Foreign Application Priority Data

Sep. 9, 1993 [DE] Germany ............... 43 30 620.9

[51] Int. Cl.⁶ .................................................. B60J 5/04
[52] U.S. Cl. .................................. 296/146.6; 296/188
[58] Field of Search ............................. 296/188, 146.6, 296/189; 49/502, 503

[56] References Cited

U.S. PATENT DOCUMENTS

| | | | |
|---|---|---|---|
| 3,788,686 | 1/1974 | Rossie et al. | 296/146.6 |
| 3,887,227 | 6/1975 | Deckert | 296/188 |
| 4,013,317 | 3/1977 | Reidelbach et al. | 296/146.6 |
| 4,462,633 | 7/1984 | Maeda | 296/188 |
| 4,488,751 | 12/1984 | Kling | 296/188 X |
| 4,915,442 | 4/1990 | Gainweidner | 296/146.6 X |
| 4,917,433 | 4/1990 | Tomforde | 296/146.6 X |
| 5,029,934 | 7/1991 | Schrader et al. | 296/188 X |
| 5,137,325 | 8/1992 | Ohya | 296/146.6 X |

FOREIGN PATENT DOCUMENTS

| | | | |
|---|---|---|---|
| 0302044 | 6/1988 | European Pat. Off. | |
| 3151861 | 7/1983 | Germany. | |
| 3425776 | 1/1986 | Germany | 296/146.6 |
| 4020745 | 1/1992 | Germany | 296/189 |
| 4140426 | 6/1993 | Germany | 296/146.6 |
| 4027619 | 1/1992 | Japan | 296/146.6 |
| 1340833 | 12/1973 | United Kingdom. | |

*Primary Examiner*—Joseph D. Pape
*Attorney, Agent, or Firm*—Evenson, McKeown, Edwards & Lenahan

[57] ABSTRACT

A lateral edge of an automobile door is provided with a reinforcing section to which a hook is bolted. A section of the hook in the closed position of door is associated with a groove-shaped recess formed in a pillar. The free end of the hook section lays roughly in the plane of the facing exterior of pillar. With a force directed against the vehicle door, the free end of hook section slides over the exterior of the pillar with a high frictional effect, so that a bead-shaped elevation results and the depth of penetration of the door into the vehicle interior is considerably reduced.

9 Claims, 1 Drawing Sheet

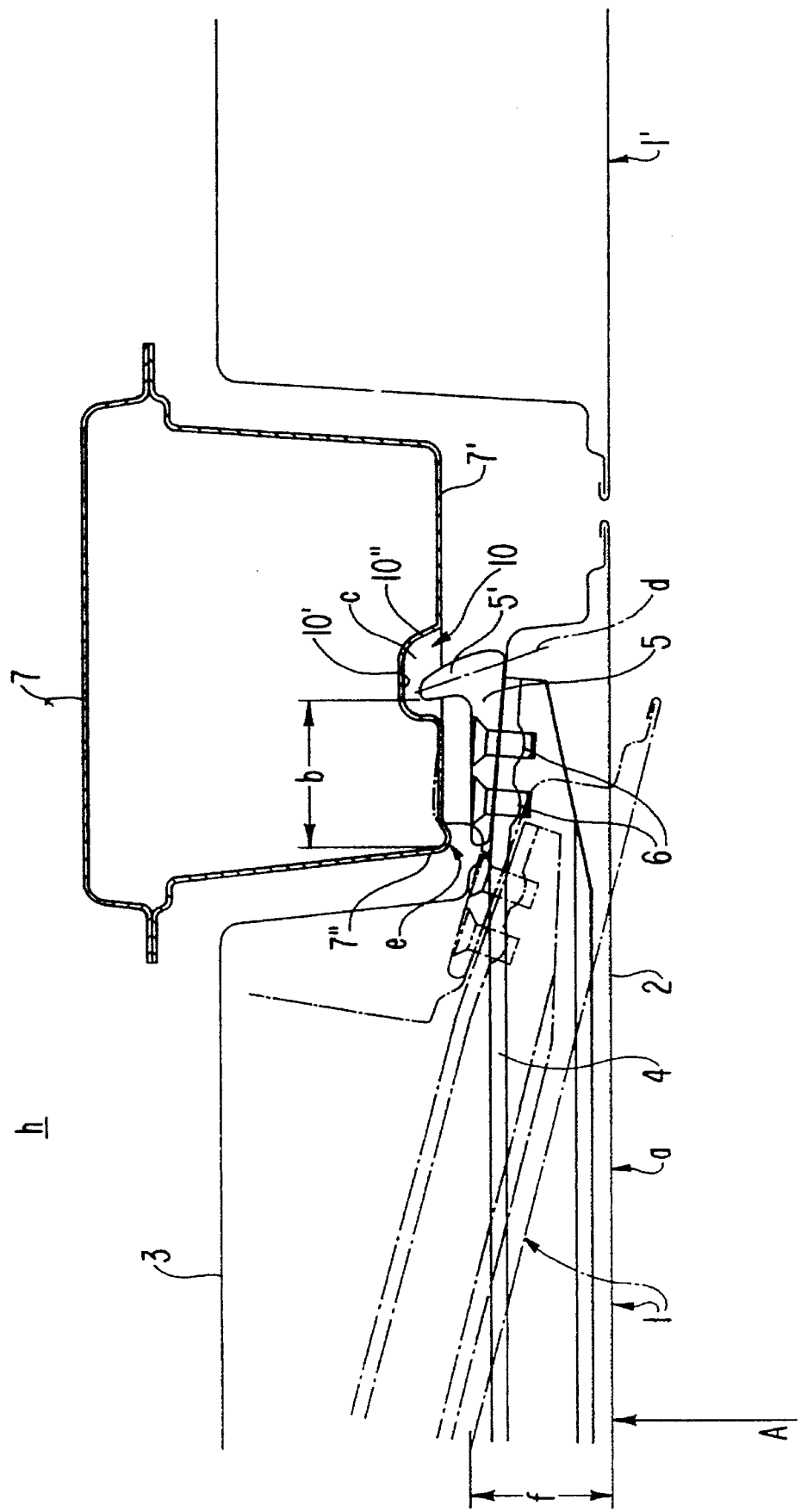

MOTOR VEHICLE DOOR PENETRATION-LIMITING DEVICE

BACKGROUND AND SUMMARY OF THE INVENTION

The present invention relates to a motor vehicle with at least one door, in which a hook is located at a free end of the door and is associated with a pillar when the vehicle door is in the closed position.

An automobile shown in GB-PS 13 40 833 has two opposite doors in its two sides, in each of whose cavities a horizontally running reinforcing section is located. One end portion of this section is connected with the door hinge, and two hooks are provided at an opposite end portion that pass through the wall surrounding the door. The free hook sections of the hooks, with the vehicle door in the closed position, each pass through a recess provided in a body pillar, so that in the event of a side collision the depth of penetration of the vehicle door into the vehicle interior of the vehicle is reduced. However, because the free hook section of the hook projects very deeply into the corresponding recess of the body pillar, in a severe head-on automobile collision in which the vehicle doors deform, the hooks will engage the pillars, so that the vehicle door can no longer be opened.

Hence, an object of the present invention is to provide a hook on a vehicle door such that, in the event of a severe head-on collision, the vehicle door can be opened, but when a force acts transverse to this direction, a limited depth of penetration into the vehicle door into the interior of the vehicle results nevertheless.

This object has been achieved in accordance with the present invention by providing that the free end of the hook in the closed position of the vehicle door is located near the facing exterior of the pillar, so that when a force is directed transversely against the vehicle door with resultant friction and deformation of the sheet metal of the facing exterior the free end of the hook cooperates with the pillar.

The hook section of the hook according to the present invention has a length such that its free end lies in the vicinity of the exterior of the pillar when the vehicle door is closed. In addition, the hook section is provided at a greater distance, namely at least approximately 10 times the thickness of the sheet metal of the pillar, from the edge of the pillar facing the door articulation (B and/or C pillars). This arrangement and configuration of the hook section of the hook means that, in the event of a force acting against the vehicle door, the hook section is initially displaced slightly outwardly, (i.e. away from the pillar), so that the free end of the hook section slides over the outside of the pillar, with the hook section constantly penetrating slightly deeper into the sheet metal of the pillar.

The resultant high friction between the hook and the pillar considerably reduces the depth of penetration of the vehicle door into the vehicle interior. If the free end of the hook section is configured with an acute angle in the manner of the blade of a plane, a notch can be produced on the outside of the pillar which considerably increases the friction effect and further reduces the depth of penetration of the vehicle door into the vehicle interior.

Another advantage of providing the notch also consists in the fact that a bead-shaped elevation can form on the edge area of the pillar facing the door articulation, against which elevation the hook section of the hook finally abuts, so that the penetration of the vehicle door into the vehicle interior is considerably reduced. The arrangement of the hook according to the present invention in the vicinity of the pillar also ensures that in the event of a head-on collision involving the motor vehicle, the vehicle door can be opened.

The bead-shaped elevation on the edge area of the pillar for cooperation with the hook section of the hook can be further increased by the hook section projecting with its free end possibly for about six (6) times the thickness of the sheet metal of the pillar into a recess provided in the latter. The hook section of the hook reliably abuts the relatively large bead-shaped elevation which is formed when a force acts on the vehicle door, so that the depth of penetration of the vehicle door into the vehicle interior is very slight.

The recess provided on the pillar is groove-shaped in an aesthetic manner. With the door in the closed position, a greater distance is provided between the free end of the hook section of the hook and the outer circumference as well as the bottom of the recess. Then the rear wall of the groove-shaped recess likewise runs diagonally to, and at an approximately parallel distance from, the diagonal rear of the hook section. This ensures that in the event of a head-on collision involving the motor vehicle, the hook is forced outward and away from the pillar, so that the vehicle door can always be opened.

The hook can be made of steel or of light metal and is advantageously bolted to the end portion of the reinforcing section. In addition, the hook can also be mounted permanently on the reinforcing section or can be made integral therewith. With the vehicle door in the closed position, the midline of the hook section of the hook runs at an angle of about 10° to 30° to a transverse plane of the vehicle or a lengthwise plane of the vehicle. Thus, in the event of a force acting on the vehicle door, the free end of the hook section of hook can engage optimally with the pillar. Advantageously, the hook is mounted on the lower, free corner area of the door and therefore has no influence on the visual appearance.

Finally the pillar can be provided internally at least in the circumferential area of the recess with sheet metal reinforcements which prevent the sheet metal of the pillar from being torn loose when it cooperates with the hook section of the hook.

BRIEF DESCRIPTION OF THE DRAWING

These and other objects, features and advantages of the present invention will become more readily apparent from the following detailed description thereof when taken in conjunction with the accompanying sole FIGURE which is a horizontal cross-section at a rear lower edge area of a side vehicle door in the closed position with a hook in accordance with the present invention in the vicinity of a pillar.

DETAILED DESCRIPTION OF THE DRAWING

A vehicle door 1 is located at the front left on an automobile (driver's door), with an adjoining rear vehicle door 1'. Thus, the body of vehicle door 1 is composed mainly of an outer door panel 2 and an inner door panel 3. These panels 2, 3 surround a cavity in which a reinforcing section 4 made of steel or light metal is located. Reinforcing section 4 runs either approximately horizontally across the entire width of the door or, as in the present embodiment, approximately diagonally from the vicinity of a door hinge to the rear lower corner area of door 1. A hook 5 is mounted by two bolts 6 at the front edge area of the door at the free end of the reinforcing section 4. The hook 5 has a hook section 5' projecting away from vehicle door 1 which faces a pillar 7 (the B pillar) in the closed position a of the vehicle door 1.

A groove-shaped recess 10 is provided in the outside 7' of pillar 7, into which recess 10 the free end of the hook section 5' of the hook 5 projects in the closed position a of the vehicle door 1 for about six (6) times the thickness of the sheet metal of pillar 7, in other words approximately 4 to 5 mm. There is also the possibility that in the closed position a of the vehicle door 1, the free end of the hook section 5' lies roughly in the plane of the facing exterior 7' of pillar 7. Finally in the closed position a of the vehicle door 1, the hook section 5' of the hook 5 is set back by a distance b from edge 7" of the pillar 7 which faces the door articulation. Dimension b is at least approximately ten (10) times the thickness of the sheet metal of pillar 7 and is therefore at least approximately 8 to 10 mm. It is also evident in the drawing that a large area c is provided, in the closed position a of the vehicle door 1, between the free end of hook section 5' of hook 5 and the bottom 10' of the recess 10. Then rear wall 10" of the groove-shaped recess 10 also runs diagonally, in other words at an acute angle, to the exterior 7' of pillar 7, and hence an approximately parallel distance from the diagonal rear opposed surface of hook section The hook 5 is made of steel or lightweight metal, with the midline d of the hook section 5' in the closed position a of the vehicle door 1 being at an angle of about 10° to 30° to a transverse plane of the vehicle. Finally, to avoid injuries, the free end of hook section 5' has a rounded shape.

With a transverse force acting against vehicle door 1 approximately in the direction of arrow A, because of a side impact or the like, the free end of the hook section 5' is initially displaced slightly upward, in other words away from the outside 7' of pillar 7. Then, the free end of the hook section 5' of the hook 5 slides over the outside 7' of the pillar 7 and thus continues to penetrate deeper and deeper into the sheet metal of the pillar, as shown by the dot-dashed lines. As a result of the resultant high friction between the hook 5 and the pillar 7, the depth of penetration f (represented by the dot-dashed lines) of the vehicle door 1 into the vehicle interior h is considerably reduced. With the lengthwise displacement of the free end of the hook section 5' described, a bead-shaped elevation e forms on the edge 7" of the pillar 7, against which bead-shaped elevation the hook section 5' of the hook 5 abuts. This abutting likewise contributes to a considerably reduced penetration of vehicle door 1 into the vehicle interior h.

In a head-on collision involving the automobile, the vehicle door 1 can be pressed against the pillar 7. The back of the hook section 5' of the hook 5, which runs diagonally relative to a transverse plane of the vehicle, can be pressed against the back wall 10" of the groove-shaped recess 10. Since the rear wall 10" forms an acute angle with the outside 7' of the pillar 7, the hook 5 is displaced slightly outward, so that the vehicle door 1 can be opened. For this purpose, the area c which is provided on all sides between the free end of hook section 5' and the groove-shaped recess 10 contributes to this effect.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. In a motor vehicle having at least one door and an associated pillar having a single, generally planar facing exterior surface, the improvement comprising at least one hook located at a free end of the door and operatively associated with a cup-shaped recess extending inwardly from the generally planar facing exterior surface of the pillar with the door in a closed position, wherein a free end of the hook in the closed position of the door is located near a bottom of the cup-shaped recess, and is configured such that, when a force is directed transversely against the door, the free end of the hook cooperates with the facing exterior of the associated pillar both frictionally and by deformation of sheet metal constituting the facing exterior.

2. In a motor vehicle according to claim 1, wherein the free end of the hook is remote from an edge of the pillar facing an articulation apparatus for the door.

3. In a motor vehicle according to claim 2, wherein the pillar is provided with a recess, and the free end of the hook projects for only about six times the thickness of pillar sheet metal into the recess.

4. In a motor vehicle according to claim 3, wherein the recess is groove-shaped, whereby in the closed position of the door, a relatively large gap is provided between the free end of the hook and the recess.

5. In a motor vehicle according to claim 1, wherein the hook is made of steel or lightweight metal.

6. In a motor vehicle according to claim 1, wherein a door reinforcing section is provided with the hook bolted thereto.

7. In a motor vehicle according to claim 2, wherein the free end of the hook, with the door in the closed position, is set back at least by approximately ten times the thickness of the sheet metal of the pillar from the edge facing the door articulation apparatus.

8. In a motor vehicle according to claim 1, wherein the midline of the free end of the hook, with the door, configured as a side door, in the closed position is at an angle of one of approximately 10° to 30° to a transverse plane of the vehicle.

9. In a motor vehicle according to claim 4, wherein with the door configured as a side door, a back of the free end of hook extends diagonally rearward toward the outside with respect to a transverse plane of the vehicle and therefore at an approximately parallel distance from a rear wall of the groove-shaped recess.

\* \* \* \* \*